(12) United States Patent
Connor

(10) Patent No.: US 7,978,407 B1
(45) Date of Patent: Jul. 12, 2011

(54) HOLOVISION (TM) 3D IMAGING WITH ROTATING LIGHT-EMITTING MEMBERS

(75) Inventor: Robert A. Connor, Minneapolis, MN (US)

(73) Assignee: Holovisions LLC, Minneapolis, MN (US)

(*) Notice: Subject to any disclaimer, the term of this patent is extended or adjusted under 35 U.S.C. 154(b) by 186 days.

(21) Appl. No.: 12/459,159

(22) Filed: Jun. 27, 2009

(51) Int. Cl.
G02B 27/22 (2006.01)
H04N 13/04 (2006.01)

(52) U.S. Cl. .......... 359/463; 359/462; 359/472; 348/54

(58) Field of Classification Search .............. 359/462, 359/463, 464, 472; 348/54
See application file for complete search history.

(56) References Cited

U.S. PATENT DOCUMENTS

| | | | |
|---|---|---|---|
| 3,199,116 A | 8/1965 | Ross | |
| 4,692,878 A | 9/1987 | Ciongoli | |
| 4,740,073 A | 4/1988 | Meacham | |
| 4,829,365 A | 5/1989 | Eichenlaub | |
| 4,853,769 A * | 8/1989 | Kollin | 348/54 |
| 5,111,313 A | 5/1992 | Shires | |
| 5,132,839 A | 7/1992 | Travis | |
| 5,300,942 A | 4/1994 | Dolgoff | |
| 5,311,220 A | 5/1994 | Eichenlaub | |
| 5,315,377 A | 5/1994 | Isono et al. | |
| 5,416,509 A | 5/1995 | Sombrowsky | |
| 5,465,175 A | 11/1995 | Woodgate et al. | |
| 5,493,427 A | 2/1996 | Nomura et al. | |
| 5,550,676 A | 8/1996 | Ohe et al. | |
| 5,602,679 A | 2/1997 | Dolgoff et al. | |
| 5,689,321 A | 11/1997 | Kochi | |
| 5,704,061 A | 12/1997 | Anderson | |
| 5,712,732 A | 1/1998 | Street | |
| 5,726,800 A | 3/1998 | Ezra et al. | |
| 5,790,086 A | 8/1998 | Zelitt | |
| 5,825,541 A | 10/1998 | Imai | |
| 5,855,425 A | 1/1999 | Hamagishi | |
| 5,872,590 A | 2/1999 | Aritake et al. | |
| 5,880,704 A | 3/1999 | Takezaki | |
| 5,900,982 A | 5/1999 | Dolgoff et al. | |
| 5,943,166 A | 8/1999 | Hoshi et al. | |
| 5,959,664 A | 9/1999 | Woodgate | |
| 5,986,804 A | 11/1999 | Mashitani et al. | |
| 5,986,811 A | 11/1999 | Wohlstadter | |
| 5,993,003 A | 11/1999 | McLaughlin | |
| 6,014,164 A | 1/2000 | Woodgate et al. | |
| 6,014,259 A | 1/2000 | Wohlstadter | |
| 6,061,083 A | 5/2000 | Aritake et al. | |

(Continued)

OTHER PUBLICATIONS

U.S. Appl. No. 12/317,856, filed Dec. 30, 2008, Connor, Robert. U.S. Appl. No. 12/317,857, filed Dec. 30, 2008, Connor, Robert.

*Primary Examiner* — Audrey Y Chang

(57) ABSTRACT

This invention is a novel device that displays three-dimensional moving images featuring binocular disparity and motion parallax that can be seen simultaneously by multiple viewers in different positions without requiring headgear. This device comprises: longitudinal light-guiding members that rotate around their longitudinal axes; and light-emitting members inside, or attached to, each longitudinal light-guiding member. Changes in the content of light rays from the light-emitting members are coordinated with changes in the directions of these light rays so that viewers in different positions can see appropriate three-dimensional images. Advantageous features include: no headgear required, allows multiple viewers, high image resolution, avoids pseudoscopic images, offers wide viewing range, scalable to large size displays, multi-directional motion parallax, high light efficiency, avoids head tracking, avoids reciprocal motion, avoids fluid lag, avoids ghost-like images, and avoids use of coherent light.

19 Claims, 10 Drawing Sheets

U.S. PATENT DOCUMENTS

| | | | |
|---|---|---|---|
| 6,061,489 A | 5/2000 | Ezra et al. | |
| 6,115,058 A | 9/2000 | Omori et al. | |
| 6,118,584 A | 9/2000 | Van Berkel et al. | |
| 6,128,132 A | 10/2000 | Wieland et al. | |
| 6,201,565 B1 | 3/2001 | Balogh | |
| 6,219,184 B1 * | 4/2001 | Nagatani | 359/472 |
| 6,229,562 B1 | 5/2001 | Kremen | |
| 6,304,263 B1 | 10/2001 | Chiabrera et al. | |
| 6,329,963 B1 | 12/2001 | Chiabrera et al. | |
| 6,337,721 B1 | 1/2002 | Hamagishi et al. | |
| 6,344,837 B1 | 2/2002 | Gelsey | |
| 6,437,915 B2 | 8/2002 | Moseley et al. | |
| 6,437,920 B1 | 8/2002 | Wohlstadter | |
| 6,462,871 B1 | 10/2002 | Morishima | |
| 6,481,849 B2 | 11/2002 | Martin et al. | |
| 6,483,534 B1 | 11/2002 | d'Ursel | |
| 6,487,020 B1 | 11/2002 | Favalora | |
| 6,533,420 B1 | 3/2003 | Eichenlaub | |
| 6,606,078 B2 | 8/2003 | Son et al. | |
| 6,611,243 B1 | 8/2003 | Moseley et al. | |
| 6,683,725 B2 | 1/2004 | Wohlstadter | |
| 6,714,174 B2 | 3/2004 | Suyama et al. | |
| 6,720,961 B2 | 4/2004 | Tracy | |
| 6,736,512 B2 | 5/2004 | Balogh | |
| 6,765,566 B1 | 7/2004 | Tsao | |
| 6,788,274 B2 | 9/2004 | Kakeya | |
| 6,791,512 B1 | 9/2004 | Shimada | |
| 6,795,241 B1 | 9/2004 | Holzbach | |
| 6,798,390 B1 | 9/2004 | Sudo et al. | |
| 6,816,158 B1 | 11/2004 | Lemelson et al. | |
| 6,819,489 B2 | 11/2004 | Harris | |
| 6,831,678 B1 | 12/2004 | Travis | |
| 6,876,495 B2 | 4/2005 | Street | |
| 6,909,555 B2 | 6/2005 | Wohlstadter | |
| 6,929,369 B2 | 8/2005 | Jones | |
| 6,948,819 B2 | 9/2005 | Mann | |
| 6,999,071 B2 | 2/2006 | Balogh | |
| 7,023,466 B2 | 4/2006 | Favalora et al. | |
| 7,030,903 B2 | 4/2006 | Sudo | |
| 7,046,447 B2 | 5/2006 | Raber | |
| 7,084,841 B2 | 8/2006 | Balogh | |
| 7,106,519 B2 | 9/2006 | Aizenberg et al. | |
| 7,113,158 B1 | 9/2006 | Fujiwara et al. | |
| 7,123,287 B2 | 10/2006 | Surman | |
| 7,142,232 B2 | 11/2006 | Kremen | |
| 7,154,653 B2 | 12/2006 | Kean et al. | |
| 7,167,313 B2 | 1/2007 | Wohlstadter | |
| 7,182,463 B2 | 2/2007 | Conner et al. | |
| 7,204,593 B2 | 4/2007 | Kubota et al. | |
| 7,250,990 B2 | 7/2007 | Sung et al. | |
| 7,261,417 B2 | 8/2007 | Cho et al. | |
| 7,265,902 B2 | 9/2007 | Lee et al. | |
| 7,268,943 B2 | 9/2007 | Lee | |
| 7,277,226 B2 | 10/2007 | Cossairt et al. | |
| 7,283,308 B2 | 10/2007 | Cossairt et al. | |
| 7,297,474 B2 | 11/2007 | Aizenberg et al. | |
| 7,300,157 B2 | 11/2007 | Conner et al. | |
| 7,327,389 B2 | 2/2008 | Horimai et al. | |
| 7,336,244 B2 | 2/2008 | Suyama et al. | |
| 7,342,721 B2 | 3/2008 | Lukyanitsa | |
| 7,364,300 B2 | 4/2008 | Favalora et al. | |
| 7,375,885 B2 | 5/2008 | Ijzerman et al. | |
| 7,382,425 B2 | 6/2008 | Sung et al. | |
| 7,400,447 B2 | 7/2008 | Sudo et al. | |
| 7,423,796 B2 | 9/2008 | Woodgate et al. | |
| 7,425,951 B2 | 9/2008 | Fukushima et al. | |
| 7,426,068 B2 | 9/2008 | Woodgate et al. | |
| 7,432,892 B2 | 10/2008 | Lee et al. | |
| 7,446,733 B1 | 11/2008 | Hirimai | |
| 7,450,188 B2 | 11/2008 | Schwerdtner | |
| 7,471,352 B2 | 12/2008 | Woodgate et al. | |
| 7,490,941 B2 | 2/2009 | Mintz et al. | |
| 7,492,513 B2 | 2/2009 | Fridman et al. | |
| 7,492,523 B2 | 2/2009 | Dolgoff | |
| 7,505,646 B2 | 3/2009 | Katou et al. | |
| 7,506,984 B2 | 3/2009 | Saishu et al. | |
| 7,513,623 B2 | 4/2009 | Thomas | |
| 7,525,541 B2 | 4/2009 | Chun et al. | |
| 7,532,225 B2 | 5/2009 | Fukushima et al. | |
| 7,554,625 B2 * | 6/2009 | Koganezawa | 349/61 |
| 7,688,376 B2 * | 3/2010 | Kondo et al. | 348/340 |
| 2003/0025995 A1 | 2/2003 | Redert et al. | |
| 2003/0058209 A1 | 3/2003 | Balogh | |
| 2003/0071813 A1 | 4/2003 | Chiabrera et al. | |
| 2003/0076423 A1 | 4/2003 | Dolgoff | |
| 2003/0103047 A1 | 6/2003 | Chiabrera et al. | |
| 2003/0107805 A1 | 6/2003 | Street | |
| 2003/0206343 A1 | 11/2003 | Morishima et al. | |
| 2004/0012671 A1 | 1/2004 | Jones et al. | |
| 2004/0141237 A1 | 7/2004 | Wohlstadter | |
| 2004/0178969 A1 | 9/2004 | Zhang et al. | |
| 2004/0212550 A1 | 10/2004 | He | |
| 2004/0240777 A1 | 12/2004 | Woodgate et al. | |
| 2004/0252187 A1 | 12/2004 | Alden | |
| 2005/0030308 A1 | 2/2005 | Takaki | |
| 2005/0041162 A1 | 2/2005 | Lee et al. | |
| 2005/0053274 A1 | 3/2005 | Mayer et al. | |
| 2005/0111100 A1 | 5/2005 | Mather et al. | |
| 2005/0117016 A1 | 6/2005 | Surman | |
| 2005/0117215 A1 | 6/2005 | Lange | |
| 2005/0152156 A1 | 7/2005 | Favalora et al. | |
| 2005/0180007 A1 | 8/2005 | Cossairt et al. | |
| 2005/0219693 A1 | 10/2005 | Hartkop et al. | |
| 2005/0231810 A1 | 10/2005 | Wohlstadter | |
| 2005/0248972 A1 | 11/2005 | Kondo et al. | |
| 2005/0264560 A1 | 12/2005 | Hartkop et al. | |
| 2005/0264651 A1 | 12/2005 | Saishu et al. | |
| 2005/0270645 A1 | 12/2005 | Cossairt et al. | |
| 2005/0280894 A1 | 12/2005 | Hartkop et al. | |
| 2005/0285936 A1 | 12/2005 | Redert et al. | |
| 2006/0012542 A1 | 1/2006 | Alden | |
| 2006/0023065 A1 | 2/2006 | Alden | |
| 2006/0109200 A1 | 5/2006 | Alden | |
| 2006/0109202 A1 | 5/2006 | Alden | |
| 2006/0158729 A1 | 7/2006 | Vissenberg et al. | |
| 2006/0176541 A1 | 8/2006 | Woodgate et al. | |
| 2006/0203208 A1 | 9/2006 | Thielman et al. | |
| 2006/0227208 A1 | 10/2006 | Saishu | |
| 2006/0244907 A1 | 11/2006 | Simmons | |
| 2006/0244918 A1 | 11/2006 | Cossairt et al. | |
| 2006/0279680 A1 | 12/2006 | Karman et al. | |
| 2007/0058127 A1 | 3/2007 | Mather et al. | |
| 2007/0058258 A1 | 3/2007 | Mather et al. | |
| 2007/0097019 A1 | 5/2007 | Wynne-Powell | |
| 2007/0109811 A1 | 5/2007 | Krijn et al. | |
| 2007/0165013 A1 | 7/2007 | Goulanian et al. | |
| 2007/0201133 A1 | 8/2007 | Cossairt | |
| 2007/0222915 A1 | 9/2007 | Niioka | |
| 2007/0242237 A1 | 10/2007 | Thomas | |
| 2007/0258139 A1 | 11/2007 | Tsai et al. | |
| 2008/0007511 A1 | 1/2008 | Tsuboi et al. | |
| 2008/0068329 A1 | 3/2008 | Shestak et al. | |
| 2008/0117233 A1 | 5/2008 | Mather et al. | |
| 2008/0117289 A1 | 5/2008 | Schowengerdt et al. | |
| 2008/0150936 A1 | 6/2008 | Karman | |
| 2008/0192111 A1 | 8/2008 | Ijzerman | |
| 2008/0204871 A1 | 8/2008 | Mather et al. | |
| 2008/0204873 A1 | 8/2008 | Daniell | |
| 2008/0231690 A1 | 9/2008 | Woodgate et al. | |
| 2008/0266387 A1 | 10/2008 | Krijn et al. | |
| 2008/0273242 A1 | 11/2008 | Woodgate et al. | |
| 2008/0297594 A1 | 12/2008 | Hiddink et al. | |
| 2008/0297670 A1 | 12/2008 | Tzschoppe et al. | |
| 2008/0309663 A1 | 12/2008 | Fukushima et al. | |
| 2009/0002262 A1 | 1/2009 | Fukushima et al. | |
| 2009/0021824 A1 | 1/2009 | Ijzerman et al. | |
| 2009/0033812 A1 | 2/2009 | Ijzerman et al. | |
| 2009/0040753 A1 | 2/2009 | Matsumoto et al. | |
| 2009/0046037 A1 | 2/2009 | Whitehead et al. | |
| 2009/0052027 A1 | 2/2009 | Yamada et al. | |
| 2009/0052049 A1 | 2/2009 | Batchko et al. | |

| | | | | | |
|---|---|---|---|---|---|
| 2009/0052164 A1 | 2/2009 | Kashiwagi et al. | 2009/0096726 A1 | 4/2009 | Uehara et al. |
| 2009/0079728 A1 | 3/2009 | Sugita et al. | 2009/0096943 A1 | 4/2009 | Uehara et al. |
| 2009/0079733 A1 | 3/2009 | Fukushima et al. | 2009/0116108 A1 | 5/2009 | Levecq et al. |
| 2009/0080048 A1 | 3/2009 | Tsao | | | |

* cited by examiner

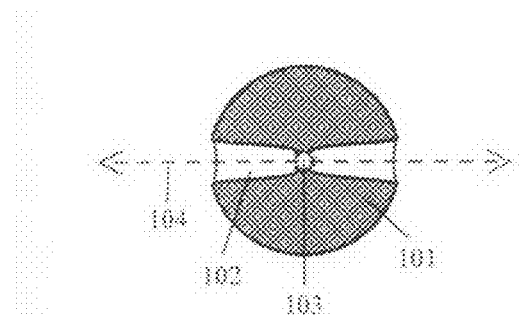
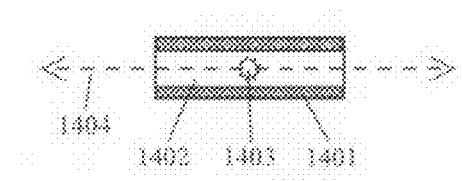
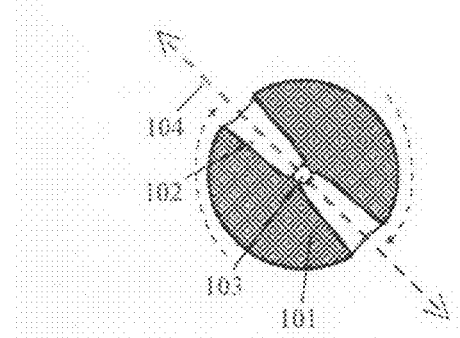
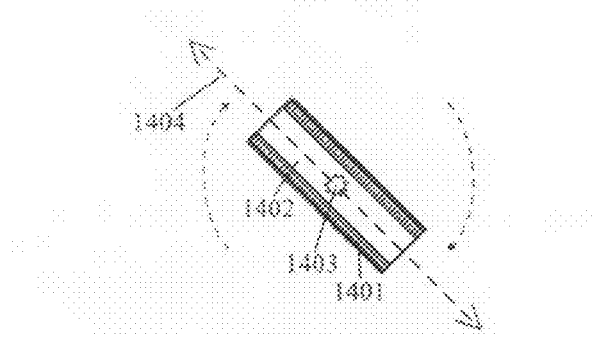
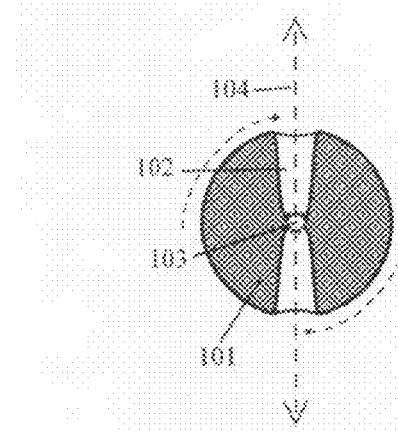
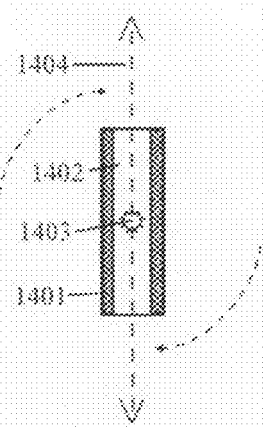
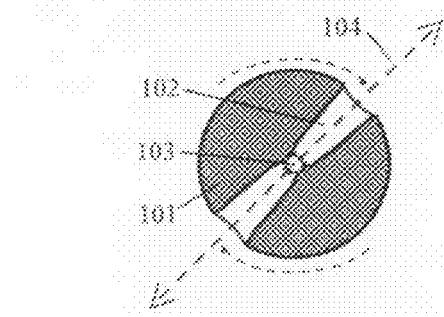
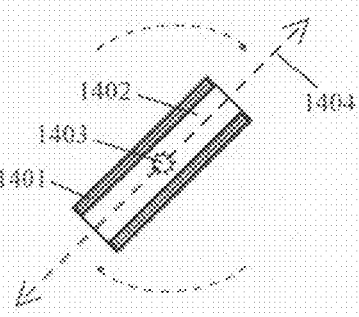
Fig. 13    Fig. 14

HOLOVISION (TM) 3D IMAGING WITH ROTATING LIGHT-EMITTING MEMBERS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

This invention relates to displaying three-dimensional moving images featuring binocular disparity and motion parallax that can be seen simultaneously by multiple viewers in different positions without requiring headgear.

2. Review of Related Art

Humans use several visual cues to recognize and interpret three-dimensionality in images. Monocular cues can be seen with just one eye. Binocular cues require two eyes. Monocular cues for three-dimensional images include: the relative sizes of objects of known size; occlusion among objects; lighting and shading; linear perspective; adjusting eye muscles to focus on an object at one distance while objects at other distances are out of focus (called "accommodation"); and objects moving relative to each other when one's head moves (called "motion parallax"). Binocular cues for three-dimensional images include: seeing different images from slightly different perspectives in one's right and left eyes (called "binocular disparity" or "stereopsis"); and intersection of the viewing axes from one's right and left eyes (called "convergence"). When a method of displaying three-dimensional images provides some of these visual cues, but not others, then the conflicting signals can cause eye strain and headaches for the viewer.

The ultimate goal for methods of displaying three-dimensional moving images is to provide as many of these visual cues for three-dimensionality as possible while also: being safe; providing good image quality and color; enabling large-scale applications; being viewable simultaneously by multiple viewers in different positions; not requiring special headgear; and being reasonably priced. This goal has not yet been achieved by current methods for displaying three-dimensional moving images. In this application, we present a taxonomy of current methods for displaying three-dimensional moving images, discuss limitations of these current methods, and then discuss how the present invention overcomes some key limitations.

Binocular disparity is a good starting point for a taxonomy of methods to display three-dimensional moving images. When images seen in the right and left eyes are different perspectives of the same scene, as would be seen if one were viewing the scene in the real world, then the brain interprets the two images as a single three-dimensional image. This process is "stereoscopic" vision. Since the invention disclosed herein provides stereoscopic vision, this discussion of related art focuses on methods that provide at least some degree of stereoscopic vision. The first branch in the taxonomy of three-dimensional display methods is between methods that require glasses or other headgear (called "stereoscopic") vs. methods that do not require glasses or other headgear (called "autostereoscopic").

The first type of stereoscopic imaging uses glasses or other headgear and a single image display that simultaneously displays encoded images for both the right and left eyes. These simultaneous images are decoded by lenses in the glasses for each eye so that each eye sees the appropriate image. Image encoding and decoding can be done by color (such as red vs. cyan) or polarization (such as linear polarization or circular polarization). A second type of stereoscopic imaging uses glasses or other headgear and a single image display source that sequentially displays images for the right and left eyes. These sequential images are each routed to the proper eye by alternating shutter mechanisms over each eye. The third type of stereoscopic imaging uses glasses or other headgear and two different image projectors, one for each eye, so that each eye receives a different image.

The main limitation of methods that display three-dimensional moving images through the use of glasses or other headgear is the inconvenience of glasses or other headgear for people who do not normally wear glasses and potential incompatibility with regular glasses for people who do normally wear glasses. Other potential limitations of these methods include: lack of motion parallax with side-to-side head movement, up-or-down head movement, or frontward-or-backward head movement; and lack of accommodation because all image points are on the same two-dimensional plane. The conflict between accommodation and convergence can cause eye strain and headaches.

There are many examples of methods using glasses or other headgear in the related art. However, the invention disclosed in this application does not require glasses or headgear, so these examples are not directly relevant and thus not listed here.

We now turn our attention to "autostereoscopic" methods for displaying three-dimensional moving images. Broadly defined, "autostereoscopic" refers to any method of displaying three-dimensional images that does not require glasses or headgear. Six general methods of autostereoscopic display are as follows: (1) methods using a "parallax barrier" to direct light from a display source in different directions by selectively blocking light rays; (2) methods using lenses (such as "lenticular" lenses) to direct light from a display source in different directions by selectively bending light rays; (3) methods using an array of "micromirrors" that can be tilted in real time to direct light from a display source in different directions by selectively reflecting light rays; (4) methods using sets of "sub-pixels" within each pixel in a display to emit light in different directions at the pixel level; (5) methods using a three-dimensional display volume or a moving two-dimensional surface to create a "volumetric" image in three-dimensional space; and (6) methods using laser light interference to create animated three-dimensional "holograms." Some of these six methods can also be used together in various combinations. As we will discuss further, the invention disclosed in this application is autostereoscopic, but a significantly improvement over current autostereoscopic methods.

We now discuss the six autostereoscopic methods in greater detail, starting with three-dimensional imaging methods using a parallax barrier. A parallax barrier selectively blocks light from a display surface (such as an LCD screen). Openings in the barrier that do not block light allow different images to reach the right and left eyes. For example, the display surface can show a composite image with vertical image stripes for right and left eye images and the parallax barrier can have vertical slits that direct the appropriate image stripes to reach the right and left eyes when the viewer is located in the right spot. When the viewer is not located in the right spot, the viewer can see "pseudoscopic" images (with reversed depth, double images, and black lines) that can cause eye strain and headaches. To partially address this problem, the system may track the location of the viewer's head and move the parallax barrier so that the viewer can see the image properly from a larger range of locations.

A basic parallax barrier system with vertical slits does not provide vertical motion parallax; there is no relative movement of objects in the image with up-or-down head movement. Also, it provides only limited horizontal motion parallax (no more than a few sequential views of objects with side-to-side head movement) due to spatial constraints between the slits and the display surface. A parallax barrier using an array of pinholes (a method with its roots in "integral photography") can provide limited motion parallax in both vertical and horizontal directions, but has significant limitations in terms of image resolution and brightness.

Having some distance between the light display surface and the parallax barrier is required so that the parallax barrier can direct light rays along different angles to the right and left eyes. However, this distance causes many of the limitations of the parallax barrier method. For example, distance significantly restricts the area within which the viewer must be located in order to see the three-dimensional images correctly. It is also why parallax barriers do not work well, or at all, for simultaneous viewing by multiple viewers. This distance is also the reason why the parallax barrier blocks so much of the light from the display surface. This causes inefficient light use and relatively dim images. As we will discuss, the invention disclosed in this application does not require such distance to direct light in different angles and thus avoids many of these problems.

There are several limitations on using one or more parallax barriers to display three-dimensional moving images. One of the main limitations is the restricted size of the viewing area within which an observer sees the images properly. When a viewer moves outside this restricted viewing area, the viewer can see pseudoscopic images with depth reversal, double images, and black bands that can cause eye strain or headaches. Head tracking mechanisms can be used in an effort to expand the size of the proper viewing area, but such tracking mechanisms can be inconvenient and do not work well for multiple viewers.

Another limitation of parallax barriers arises because the barrier blocks much of the light from the display. Display light is used inefficiently and the image can be dim. Also, due to spatial constraints between the display surface and openings in the parallax barrier, there are only a limited number of different views for motion parallax. For barriers with vertical slits, there is no motion parallax at all for up-and-down head movement. Use of pinholes instead of slits can provide motion parallax for vertical as well as horizontal movement, but also can have severe problems in terms of low image resolution and image dimness. Finally, lack of accommodation because all image points are on the same two-dimensional plane can result in eye strain and headaches.

Examples in the related art that appear to use one or more parallax barriers to display three-dimensional moving images include the following: U.S. Pat. Nos. 5,300,942 (Dolgoff, 1994), 5,416,509 (Sombrowsky, 1995), 5,602,679 (Dolgoff et al., 1997), 5,855,425 (Hamagishi, 1999), 5,900,982 (Dolgoff et al., 1999), 5,986,804 (Mashitani et al., 1999), 6,061,083 (Aritake et al., 2000), 6,337,721 (Hamagishi et al., 2002), 6,481,849 (Martin et al., 2002), 6,791,512 (Shimada, 2004), 6,831,678 (Travis, 2004), 7,327,389 (Horimai et al., 2008), 7,342,721 (Lukyanitsa, 2008), 7,426,068 (Woodgate et al., 2008), and 7,532,225 (Fukushima et al., 2009); and U.S. Patent Applications 20030076423 (Dolgoff, Eugene, 2003), 20030107805 (Street, Graham, 2003), 20030206343 (Morishima et al., 2003), 20050219693 (Hartkop et al., 2005), 20050264560 (Hartkop et al., 2005), 20050280894 (Hartkop et al., 2005), 20060176541 (Woodgate et al., 2006), 20070058258 (Mather et al., 2007), 20080117233 (Mather et al., 2008), 20080150936 (Karman, Gerardus, 2008), and 20080231690 (Woodgate et al., 2008).

We now continue our discussion of autostereoscopic methods by discussing the use of lenses (especially arrays of lenticular lenses) for displaying three-dimensional moving images. Lenticular lenses are used to selectively bend light from a display surface to create the illusion of a three-dimensional image. These lenses may be bi-convex columns, semi-cylindrical columns, hemispheres, spheres, or other shapes. Lenticular lens column arrays may be arranged vertically or horizontally. Lenticular lenses may be configured in single or multiple layers. They may be static or move relative to the display surface or each other. There are also "active" or "dynamic" lenses whose focal length and/or curvature can be adjusted in real time.

There are several similarities between using parallax barriers and using lenticular lenses. For example, parallax barriers with parallel vertical slits allow strips of different-perspective images from a display surface to reach the right and left eyes by letting light through the vertical slits. By analogy, lenticular lenses with parallel vertical columns allow strips of different-perspective images from a display surface to reach the right and left eyes by bending light at different angles through the vertical lenses. Also, as is the case with using parallax barriers, there is a restricted area within which a viewer must be located in order to see the three-dimensional images properly when using lenticular lenses. Head tracking can be used to move the lenticular array to increase the size of this area, but the number of sequential views remains limited by spatial constraints. Analogous to the use of pinholes in a parallax barrier, spherical lenses called "fly's eye" lenses can be used in a lenticular array. Taking and displaying images with an array of small "fly's eye" lenses is called "integral photography." As is the case with parallax barriers, there is also some distance between the display surface and the light-directing layer with the use of lenticular lenses.

However, lenticular lenses have some capabilities that are different than those possible with parallax barriers. This is because there are a greater variety of ways to bend light through a lens than there are ways to pass light through an empty opening. For example, there are "active" or "dynamic" lenses whose focal length and/or curvature can be changed in real time. Different methods for changing the optical characteristics of active lenses in real time include: applying an electric potential to a polymeric or elastomeric lens; mechanically deforming a liquid lens sandwiched within a flexible casing; and changing the temperature of the lens. With imaging systems that include head tracking, the focal lengths and/or curvatures of active lenses can be changed in response to movement of an observer's head.

Many of the limitations of using lenticular lenses to display three-dimensional moving images are similar to those for using parallax barriers and many of these common limitations come from the distance between the display surface and the light-guiding layer. As is the case with parallax barriers, display systems that use lenticular arrays have significant restrictions on the size of the viewing area and the number of observers. When viewers move outside this restricted area, they can see pseudoscopic images involving depth reversal, double images, and black bands that can cause eye strain and headaches. Using such systems for multiple viewers is difficult or impossible. Head tracking mechanisms used to try to expand the proper viewing area are often inconvenient and do not work well for multiple viewers. Further, the moving parts of head-tracking mechanisms are subject to wear and tear. Boundaries between light elements in lenticular display systems can create dark lines, graininess, and rough edges.

Due to spatial constraints between the display surface and the width of the lenticular lenses, there are a limited number of different views for motion parallax. With vertical columnar lenses, there is no vertical motion parallax at all. Fly's eye lens arrays can provide some vertical as well as horizontal motion parallax, but are expensive and can have significant problems in terms of low resolution and dim images. Using active lenses in lenticular displays can provide a wider range of motion parallax, but fluids or other moving materials may not change shape fast enough to display three-dimensional moving images. Lack of accommodation due to all image points being on the same plane can cause eye strain and headaches.

Examples in the related art that appear to use stationary lenticular lenses to display three-dimensional moving images include the following: U.S. Pat. Nos. 4,829,365 (Eichenlaub, 1989), 5,315,377 (Isono et al., 1994), 5,465,175 (Woodgate et al., 1995), 5,602,679 (Dolgoff et al., 1997), 5,726,800 (Ezra et al., 1998), 5,880,704 (Takezaki, 1999), 5,943,166 (Hoshi et al., 1999), 6,118,584 (Van Berkel et al., 2000), 6,128,132 (Wieland et al., 2000), 6,229,562 (Kremen, 2001), 6,437,915 (Moseley et al., 2002), 6,462,871 (Morishima, 2002), 6,611,243 (Moseley et al., 2003), 6,795,241 (Holzbach, 2004), 6,876,495 (Street, 2005), 6,929,369 (Jones, 2005), 7,142,232 (Kremen, 2006), 7,154,653 (Kean et al., 2006), 7,268,943 (Lee, 2007), 7,375,885 (Ijzerman et al., 2008), 7,400,447 (Sudo et al., 2008), 7,423,796 (Woodgate et al., 2008), 7,492,513 (Fridman et al., 2009), and 7,506,984 (Saishu et al., 2009); and U.S. Patent Applications 20040012671 (Jones et al., 2004), 20040240777 (Woodgate et al., 2004), 20050030308 (Takaki, Yasuhiro, 2005), 20050264560 (Hartkop et al., 2005), 20050264651 (Saishu et al., 2005), 20060012542 (Alden, Ray, 2006), 20060227208 (Saishu, Tatsuo, 2006), 20060244907 (Simmons, John, 2006), 20070058127 (Mather et al., 2007), 20070058258 (Mather et al., 2007), 20070097019 (Wynne-Powell, Thomas, 2007), 20070109811 (Krijn et al., 2007), 20070201133 (Cossairt, Oliver, 2007), 20070222915 (Niioka, Shinya, 2007), 20070258139 (Tsai et al., 2007), 20080068329 (Shestak et al., 2008), 20080117233 (Mather et al., 2008), 20080231690 (Woodgate et al., 2008), 20080273242 (Woodgate et al., 2008), and 20080297670 (Tzschoppe et al., 2008)

Examples in the related art that appear to use laterally-shifting lenticular lenses to display three-dimensional moving images include the following: U.S. Pat. Nos. 4,740,073 (Meacham, 1988), 5,416,509 (Sombrowsky, 1995), 5,825,541 (Imai, 1998), 5,872,590 (Aritake et al., 1999), 6,014,164 (Woodgate et al., 2000), 6,061,083 (Aritake et al., 2000), 6,483,534 (d'Ursel, 2002), 6,798,390 (Sudo et al., 2004), 6,819,489 (Harris, 2004), 7,030,903 (Sudo, 2006), 7,113,158 (Fujiwara et al., 2006), 7,123,287 (Surman, 2006), 7,250,990 (Sung et al., 2007), 7,265,902 (Lee et al., 2007), 7,375,885 (Ijzerman et al., 2008), 7,382,425 (Sung et al., 2008), and 7,432,892 (Lee et al., 2008); and U.S. Patent Applications 20030025995 (Redert et al., 2003), 20040178969 (Zhang et al., 2004), 20050041162 (Lee et al., 2005), 20050117016 (Surman, Philip, 2005), 20050219693 (Hartkop et al., 2005), 20050248972 (Kondo et al., 2005), 20050264560 (Hartkop, David; et al., 2005), 20050270645 (Cossairt et al., 2005), 20050280894 (Hartkop et al., 2005), 20060109202 (Alden, Ray, 2006), 20060244918 (Cossairt et al., 2006), 20070165013 (Goulanian et al., 2007), 20080204873 (Daniell, Stephen, 2008), 20090040753 (Matsumoto, Shinya, 2009), 20090052027 (Yamada et al., 2009), and 20090080048 (Tsao, Che-Chih, 2009).

Examples in the related art that appear to use active lenses to display three-dimensional moving images include the following: U.S. Pat. Nos. 5,493,427 (Nomura et al., 1996), 5,790,086 (Zelitt, 1998), 5,986,811 (Wohlstadter, 1999), 6,014,259 (Wohlstadter, 2000), 6,061,083 (Aritake et al., 2000), 6,437,920 (Wohlstadter, 2002), 6,533,420 (Eichenlaub, 2003), 6,683,725 (Wohlstadter, 2004), 6,714,174 (Suyama et al., 2004), 6,909,555 (Wohlstadter, 2005), 7,046,447 (Raber, 2006), 7,106,519 (Aizenberg et al., 2006), 7,167,313 (Wohlstadter, 2007), 7,297,474 (Aizenberg et al., 2007), 7,336,244 (Suyama et al., 2008), and 7,471,352 (Woodgate et al., 2008); and U.S. Patent Applications 20030058209 (Balogh, Tibor, 2003), 20040141237 (Wohlstadter, Jacob, 2004), 20040212550 (He, Zhan, 2004), 20050111100 (Mather et al., 2005), 20050231810 (Wohlstadter, Jacob, 2005), 20060158729 (Vissenberg et al., 2006), 20070058127 (Mather et al., 2007), 20070058258 (Mather et al., 2007), 20070242237 (Thomas, Clarence, 2007), 20080007511 (Tsuboi et al., 2008), 20080117289 (Schowengerdt et al., 2008), 20080192111 (Ijzerman, Willem, 2008), 20080204871 (Mather et al., 2008), 20080297594 (Hiddink et al., 2008), 20090021824 (Ijzerman et al., 2009), 20090033812 (Ijzerman et al., 2009), 20090052049 (Batchko et al., 2009), and 20090052164 (Kashiwagi et al., 2009).

Examples in the related art that appear to include head or eye tracking as part of a system to display three-dimensional moving images include the following: U.S. Pat. Nos. 5,311,220 (Eichenlaub, 1994), 5,712,732 (Street, 1998), 5,872,590 (Aritake et al., 1999), 5,959,664 (Woodgate, 1999), 6,014,164 (Woodgate et al., 2000), 6,061,083 (Aritake et al., 2000), 6,115,058 (Omori et al., 2000), 6,788,274 (Kakeya, 2004), 6,798,390 (Sudo et al., 2004), and 7,450,188 (Schwerdtner, 2008); and U.S. Patent Applications 20030025995 (Redert et al., 2003), 20070258139 (Tsai et al., 2007), and 20080007511 (Tsuboi et al., 2008).

Examples in the related art that appear to use a large rotating or tilting lens or prism as part of a system to display three-dimensional moving images include the following: U.S. Pat. Nos. 3,199,116 (Ross, 1965), 4,692,878 (Ciongoli, 1987), 6,061,489 (Ezra et al., 2000), 6,483,534 (d'Ursel, 2002), and 6,533,420 (Eichenlaub, 2003); and U.S. Patent Applications 20040178969 (Zhang et al., 2004), 20060023065 (Alden, Ray, 2006), and 20060203208 (Thielman et al., 2006).

Examples in the related art that appear to use multiple rotating or tilting lenses or prisms as part of a system to display three-dimensional moving images include the following: U.S. Pat. Nos. 7,182,463 (Conner et al., 2007), 7,300,157 (Conner et al., 2007), and 7,446,733 (Hirimai, 2008), and unpublished U.S. Patent Applications 12/317,856 (Connor, Robert, 2008) and 12/317,857 (Connor, Robert, 2008).

We now continue discussion of autostereoscopic methods by considering micromirror arrays. A micromirror array is a matrix of very tiny mirrors that can be individually controlled and tilted in real time to reflect light beams in different directions. Micromirror arrays are often used with coherent light, such as the light from lasers. Coherent light can be precisely targeted onto and reflected from moving mirrors. These redirected coherent light beams can be intersected to create a moving holographic image.

Although micromirror arrays offer some advantages over parallax barriers and lenticular arrays, they can be complicated and expensive to manufacture. They also have mechanical limitations with respect to speed and range of motion. If they are used with coherent light, then there can be expense and safety issues. If they are used with non-coherent light, then there can be issues with image quality due to the imprecision of reflecting non-coherent light from such tiny surface areas.

Examples in the related art that appear to use micromirror arrays to display three-dimensional moving images include the following: U.S. Pat. Nos. 5,689,321 (Kochi, 1997), 6,061,083 (Aritake et al., 2000), 6,304,263 (Chiabrera et al., 2001), 7,182,463 (Conner et al., 2007), 7,204,593 (Kubota et al., 2007), 7,261,417 (Cho et al., 2007), 7,300,157 (Conner et al., 2007), and 7,505,646 (Katou et al., 2009); and U.S. Patent Applications 20030058209 (Balogh, Tibor, 2003), 20040252187 (Alden, Ray, 2004), and 20050248972 (Kondo et al., 2005).

We now continue further along the autostereoscopic branch of our taxonomy to discuss the use of three-dimensional (3D) pixels. Each 3D pixel contains a set of sub-pixels, in different discrete locations, that each emit light in a different direction. For example, a 3D pixel can be made from a set of sub-pixels in proximity to a pixel-level microlens wherein the light from each sub-pixel enters and exits the microlens at a different angle. In another example, a 3D pixel can be made from a set of optical fibers that emit light at different angles.

The concept of 3D pixels has considerable appeal, but is complicated to implement. Manufacturing 3D pixels can be complex and expensive. There are spatial limits to how many discrete sub-pixels one can fit into a space the size of a pixel. This, in turn, limits image resolution and quality. Large displays can become bulky and expensive due to the enormous quantity of sub-pixels required and the complicated structures required to appropriately direct their light outputs. Microstructures (such as microdomes) to house multiple sub-pixels that protrude from the display surface can occlude the light from sub-pixels in adjacent pixels, limiting the size of the proper viewing zone.

Examples in the related art that appear to use 3D pixels containing sets of sub-pixels to display three-dimensional moving images include the following: U.S. Pat. Nos. 5,132,839 (Travis, 1992), 5,550,676 (Ohe et al., 1996), 5,993,003 (McLaughlin, 1999), 6,061,489 (Ezra et al., 2000), 6,128,132 (Wieland et al., 2000), 6,201,565 (Balogh, 2001), 6,329,963 (Chiabrera et al., 2001), 6,344,837 (Gelsey, 2002), 6,606,078 (Son et al., 2003), 6,736,512 (Balogh, 2004), 6,999,071 (Balogh, 2006), 7,084,841 (Balogh, 2006), 7,204,593 (Kubota et al., 2007), 7,283,308 (Cossairt et al., 2007), 7,425,951 (Fukushima et al., 2008), 7,446,733 (Hirimai, 2008), and 7,532,225 (Fukushima et al., 2009); and U.S. Patent Applications 20030071813 (Chiabrera et al., 2003), 20030103047 (Chiabrera et al., 2003), 20050053274 (Mayer et al., 2005), 20050285936 (Redert et al., 2005), 20060227208 (Saishu, Tatsuo, 2006), 20060279680 (Karman et al., 2006), 20080150936 (Karman, Gerardus, 2008), 20080266387 (Krijn et al., 2008), 20080309663 (Fukushima et al., 2008), 20090002262 (Fukushima et al., 2009), 20090046037 (Whitehead et al., 2009), 20090079728 (Sugita et al., 2009), 20090079733 (Fukushima et al., 2009), 20090096726 (Uehara et al., 2009), 20090096943 (Uehara et al., 2009), and 20090116108 (Levecq et al., 2009).

We now continue our review of autostereoscopic methods by discussing three-dimensional display volumes and moving two-dimensional surfaces that create a "volumetric" image in three-dimensional space. "Volumetric" means that the points that comprise the three-dimensional image are actually spread out in three-dimensions instead of on a flat display surface. In this respect, volumetric displays are not an illusion of three-dimensionality; they are actually three dimensional. Major types of volumetric displays are: (a) curved screen displays (such as a cylindrical or hemispherical projection surface); (b) static volumetric displays (such as an X,Y,Z matrix of light elements in 3D space or a series of parallel 2D display layers with adjustable transparency); and (c) dynamic volumetric displays with two-dimensional screens that rotate through space (such as a spinning disk or helix) while emitting, reflecting, or diffusing light.

Many planetariums use a dome-shaped projection surface as a form of volumetric display. The audience sits under the dome while light beams representing stars and planets are projected onto the dome, creating a three-dimensional image. Static volumetric displays can be made from a three-dimensional matrix of LEDs or fiber optics. Alternatively, a static volumetric display can be a volume of translucent substance (such as a gel or fog) into which light beams can be focused and intersected. One unusual version of a static volumetric display involves intersecting infrared laser beams in mid-air to create a pattern of glowing plasma bubbles in mid-air. This plasma method is current quite limited in terms of the number of display points, color, and safety issues, but is one of the few current display methods that genuinely projects images in "mid-air."

There are several limitations of using volumetric methods to display three-dimensional moving images. Curved screen methods are significantly limited with respect to the shape of three-dimensional image that they can display; planetariums work because a dome-shaped display surface works as a proxy for the sky, but would not work well for projecting a 3D image of a car. Large static volumetric displays become very bulky, heavy, complex, and costly. Also, both static and dynamic volumetric displays generally create ghost-like images with no opacity, limited interposition, limited color, and low resolution. There are significant limitations on the size of dynamic volumetric displays due to the mass, inertia, and structural stress of large rapidly-spinning objects.

Examples in the related art that appear to use volumetric displays to display three-dimensional moving images include the following: U.S. Pat. Nos. 5,111,313 (Shires, 1992), 5,704,061 (Anderson, 1997), 6,487,020 (Favalora, 2002), 6,720,961 (Tracy, 2004), 6,765,566 (Tsao, 2004), 6,948,819 (Mann, 2005), 7,023,466 (Favalora et al., 2006), 7,277,226 (Cossairt et al., 2007), 7,364,300 (Favalora et al., 2008), 7,490,941 (Mintz et al., 2009), 7,492,523 (Dolgoff, 2009), and 7,525,541 (Chun et al., 2009); and U.S. Patent Applications 20050117215 (Lange, Eric, 2005), 20050152156 (Favalora et al., 2005), 20050180007 (Cossairt et al., 2005), and 20060109200 (Alden, Ray, 2006). A closely related method that involves using a vibrating projection screen is disclosed in U.S. Pat. Nos. 6,816,158 (Lemelson et al., 2004) and 7,513,623 (Thomas, 2009).

We now conclude our review of autostereoscopic methods by discussing holographic methods of displaying three-dimensional moving images. Holography involves recording and reconstructing the amplitude and phase distributions of an interference pattern of intersecting light beams. The light interference pattern is generally created by the intersection of two beams of coherent (laser) light: a signal beam that is reflected off (or passed through) an object and a reference beam that comes from the same source. When the interference pattern is recreated and viewed by an observer, it appears as a three-dimensional object that can be seen from multiple perspectives.

Holography has been used for many years to create three-dimensional static images and progress has been made toward using holographic images to display three-dimensional moving images, but holographic video remains quite limited. Limitations of using holographic technology for displaying three-dimensional moving images include the following: huge data requirements; display size limitations; color limitations; ghost-like images with no opacity and limited interposition; and cost and safety issues associated with using lasers.

INVENTION SUMMARY AND ADVANTAGES

The invention disclosed herein, called "Holovision"™, is a novel autostereoscopic device that displays three-dimensional moving images featuring binocular disparity and motion parallax that can be seen simultaneously by multiple viewers in different positions without headgear. This device uniquely addresses many of the limitations of methods for displaying three-dimensional images in the related art.

The invention disclosed herein is a device comprising: (1) a plurality of longitudinal light-guiding members that rotate around their longitudinal axes; and (2) a plurality of light-emitting members inside, or attached to, each longitudinal light-guiding member. Light rays from the light-emitting members are guided through light-transmitting portions in the longitudinal light-guiding member so that the directions of these light rays change as the longitudinal light-guiding member rotates. Further, changes in the content of light rays from the light-emitting members are coordinated with changes in the directions of these light rays so that different viewers in different positions all see appropriate three-dimensional images.

Advantages of this present invention over different methods in the related art include the following. No current method in the related art offers all of these advantages.

AUTOSTEREOSCOPIC: This invention does not require viewers to wear glasses or other headgear.
MULTIPLE VIEWERS: This invention works for multiple viewers in different positions.
HIGH RESOLUTION: This invention provides high image resolution due to continuous, rather than discrete, variation of light ray angles. It is not limited, for example, by spatial constraints on how many discrete sub-pixels one can fit into a pixel-size space or how many slits per pixel one can fit into a parallax barrier.
AVOID PSEUDOSCOPIC IMAGES: This invention avoids pseudoscopic images (such as depth reversal, double images, and black bands) by integrating light-emitting members into rotating light guides.
WIDE VIEWING RANGE: This invention allows viewers to see proper three-dimensional images from a very wide viewing area.
SCALABLE: This invention is scalable from very small to very large displays. Its scale is not limited by: the inertial, structural, and safety problems associated with large-scale rotating members; the bulk, weight, and cost problems associated with large-scale fixed volumetric displays; or the severe size constraints associated with current holographic methods using coherent light.
MULTI-DIRECTIONAL MOTION PARALLAX: This invention can provide motion parallax in multiple directions for multiple viewers without any headgear or head tracking mechanism.
LIGHT EFFICIENCY: This invention avoids dim images by using light more efficiently than parallax barriers and light guides in the related art.
AVOID HEAD TRACKING: This invention avoids the constraints of head tracking.
AVOID RECIPROCAL MOTION: This invention avoids the inertial, mechanical, and performance problems of light barriers or guides that move in a "back-and-forth" manner.
AVOID FLUID LAG: This invention avoids the time lag involved in reconfiguring a fluid lens to alter the angle of a light ray.
AVOID GHOST-LIKE IMAGES: This invention avoids the ghost-like images of many volumetric displays.
AVOID COHERENT LIGHT: This invention avoids the expense and safety issues associated with using coherent light.

INTRODUCTION TO THE DRAWINGS

The figures discussed herein show selected examples of how this invention may be embodied, but these figures do not limit the full generalizability of the claims.

Figure 5:
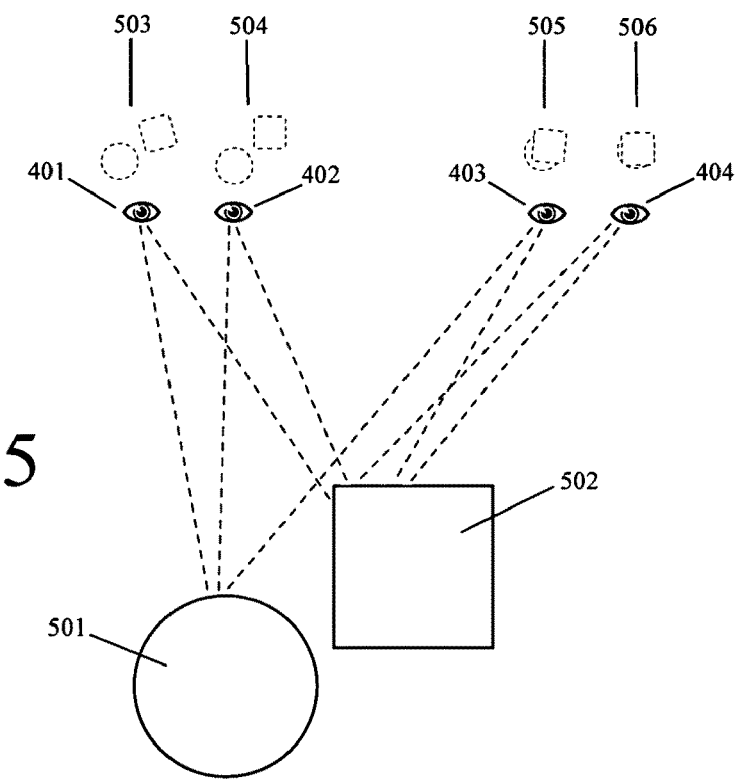
Figure 6:
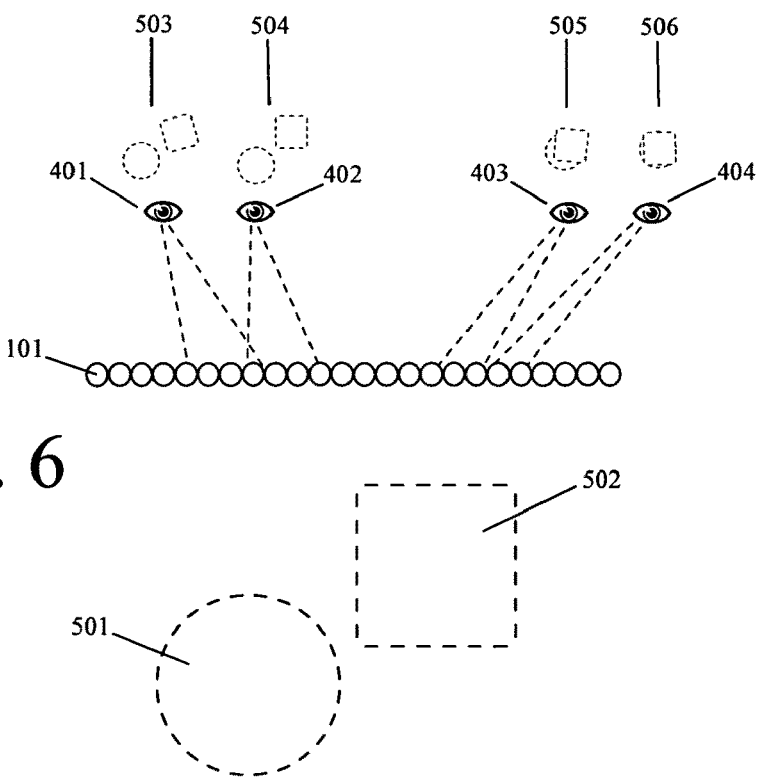

FIGS. 5 and 6 provide a conceptual view of how this device replicates the light beam content and angles that the two viewers see when viewing three-dimensional objects in the real world.

Figure 7:
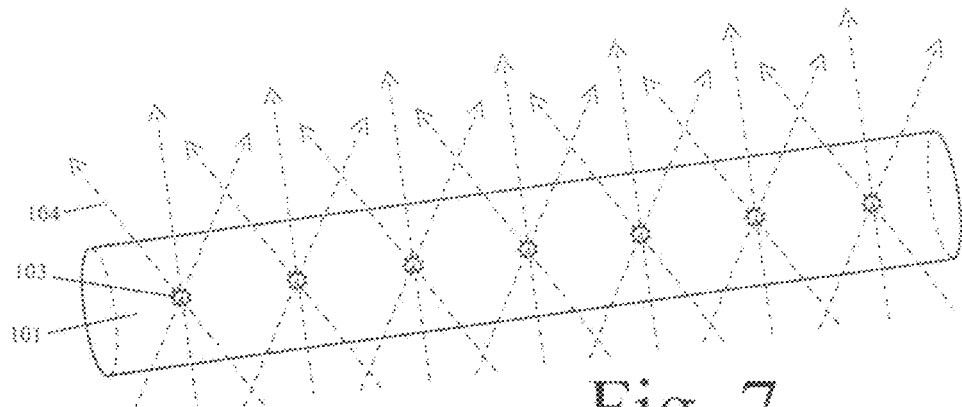

FIG. 7 shows a longitudinal cross-sectional view of one column in this example.

Figure 8:
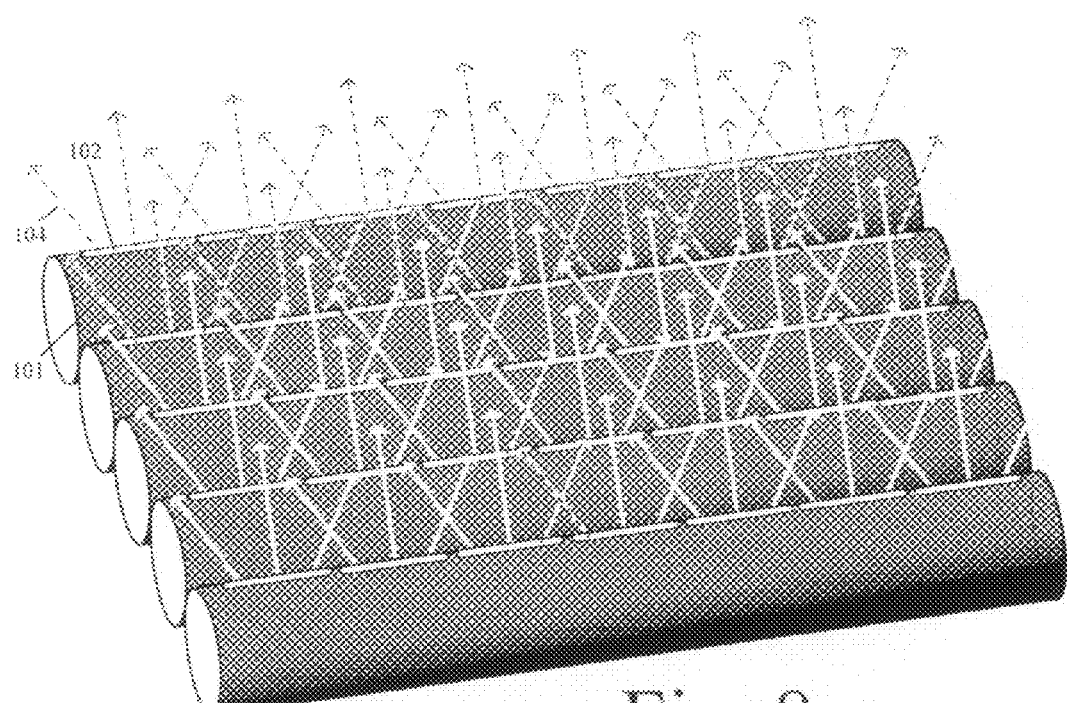

FIG. 8 shows an oblique exterior view of five parallel columns in this example.

Figure 9:
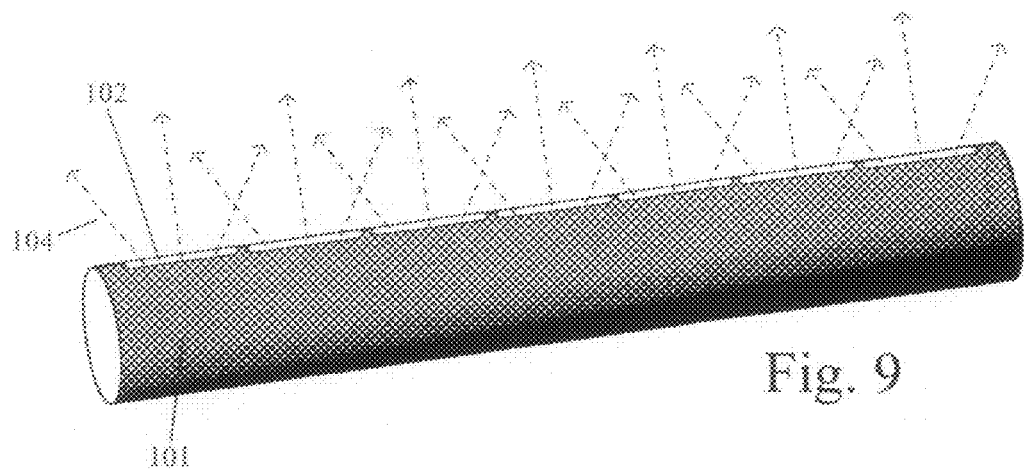
Figure 10:
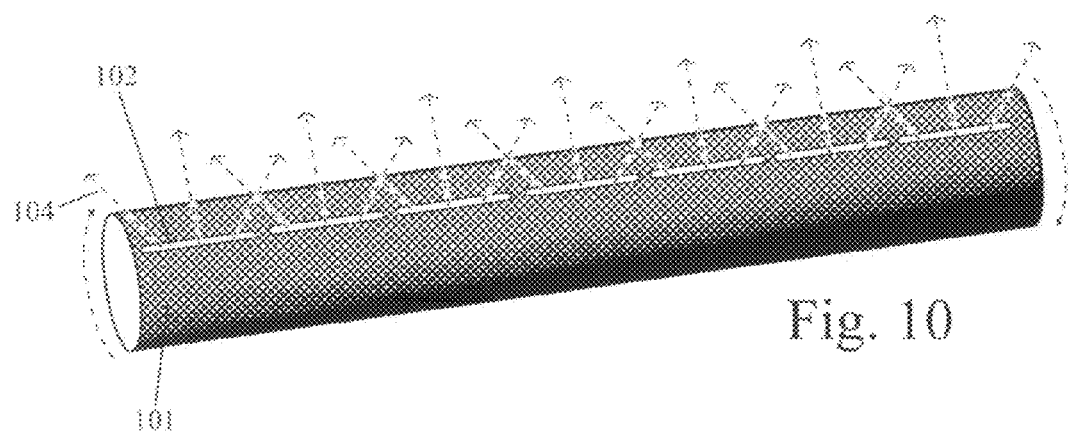
Figure 11:
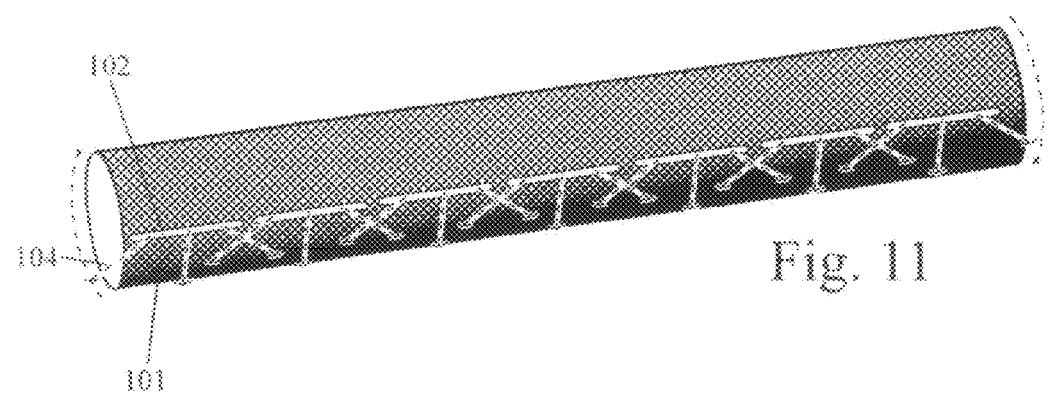

FIGS. 9 through 11 show how the light rays fanning out from a column move as the column rotates.

Figure 12:
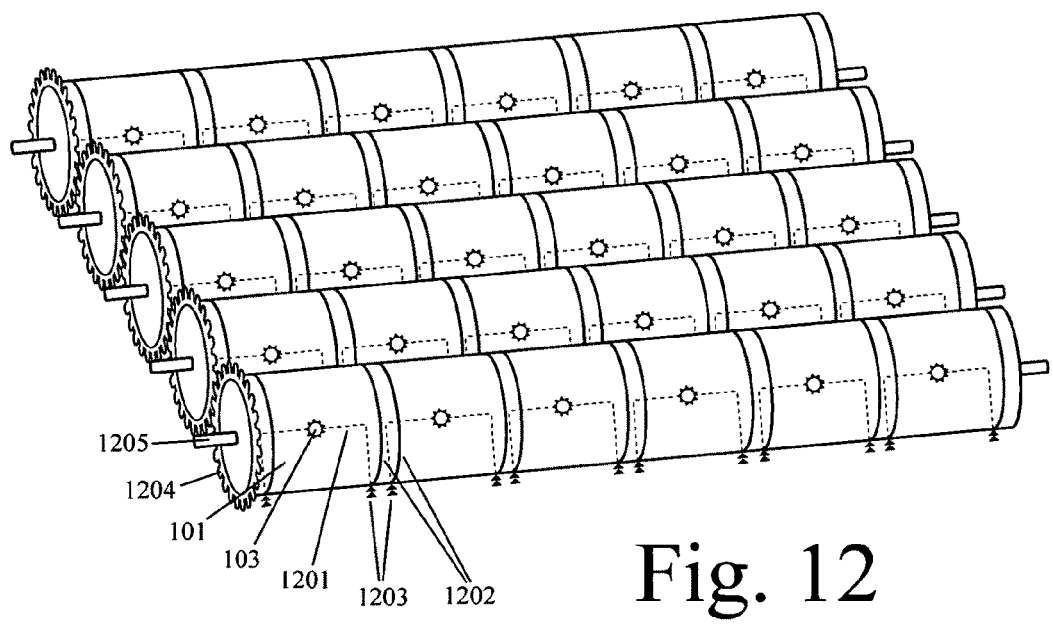

FIG. 12 shows one way by which columns may be rotated and one way by which power may be delivered to light-emitting members within the columns.

FIG. 13 shows a cross-sectional view of a column with a circular cross-section through four sequences of rotation.

FIG. 14 shows a cross-sectional view of an alternative column with a rectangular cross-section through four sequences of rotation.

Figure 15:
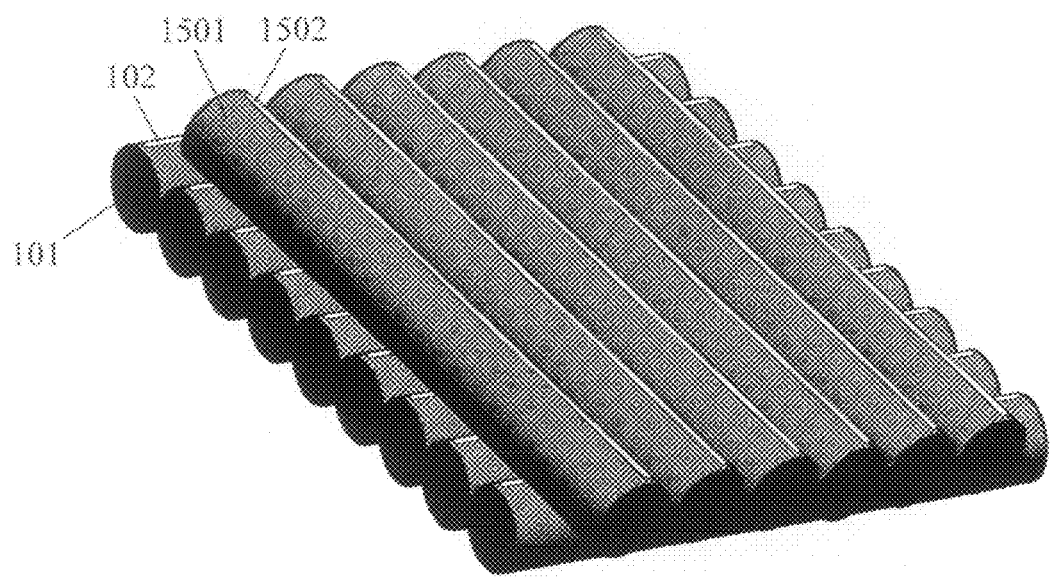
Figure 16:
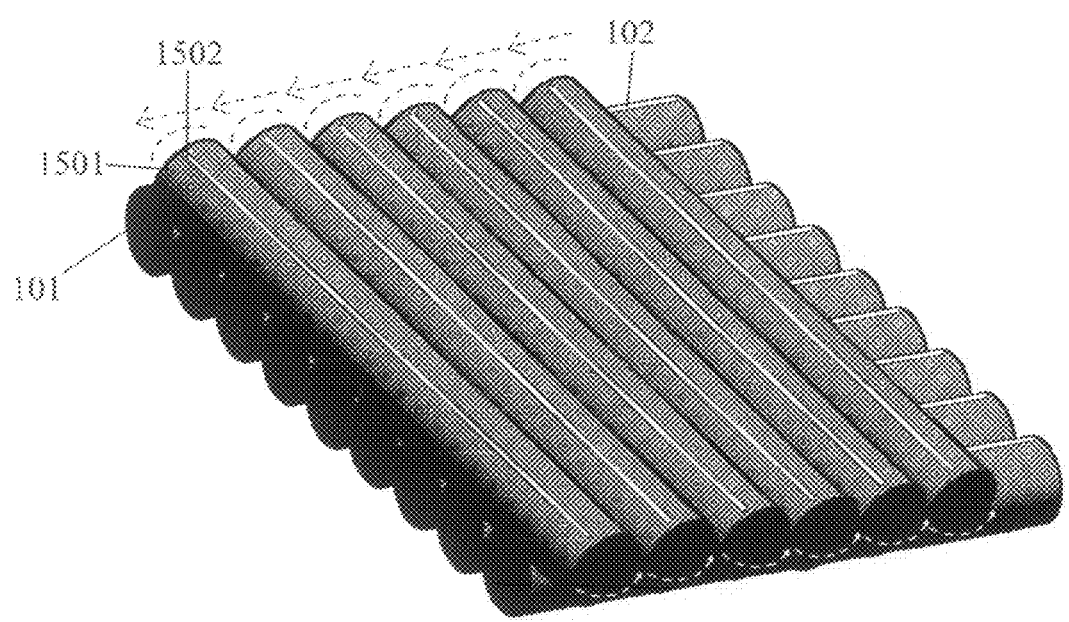

FIGS. 15 and 16 show the addition of a second layer of rotating columns that allows motion parallax when a viewer moves their head vertically (up and down) in addition to motion parallax when a viewer moves their head horizontally (back and forth).

FIGS. 17 through 25 show a sequence of views of an example of sequential rotation and shifting of a second layer of columns relative to rotation of a first layer of columns.

Figure 26:
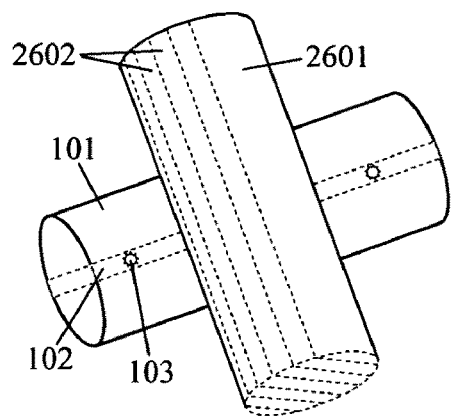
Figure 27:
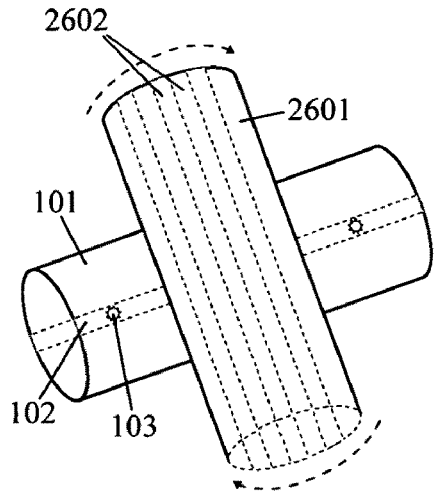
Figure 28:
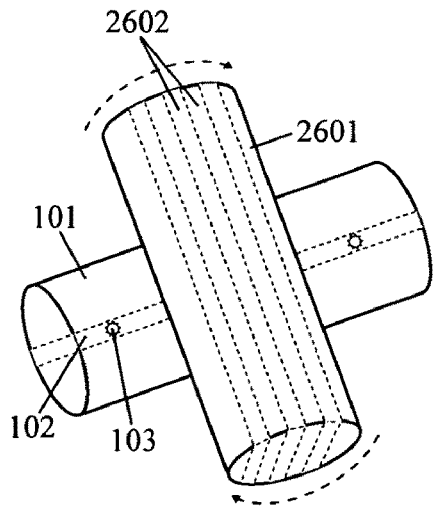

FIGS. 26 through 28 show an example of this invention in which the rotating columns of a second layer have multiple light-transmitting portions.

DETAILED DESCRIPTION

Figure 1:
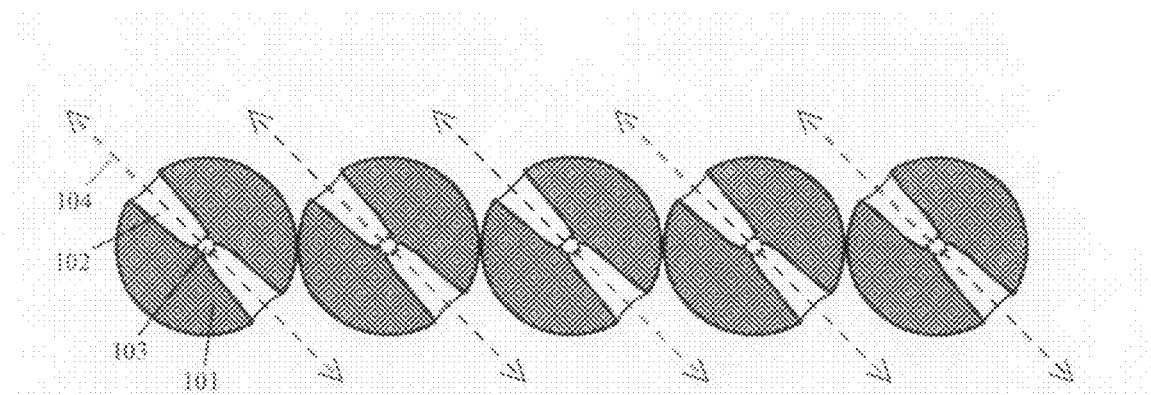
FIGS. 1 through 3 show a lateral cross-sectional view of an example of this invention with light-emitting members within five parallel longitudinal columns that rotate around their longitudinal axes.
Figure 2:
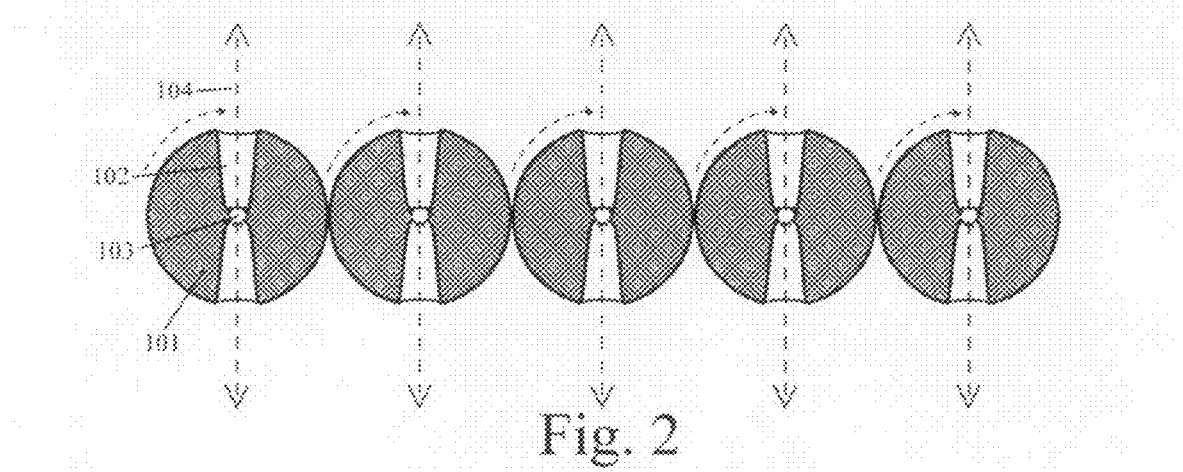
Figure 3:
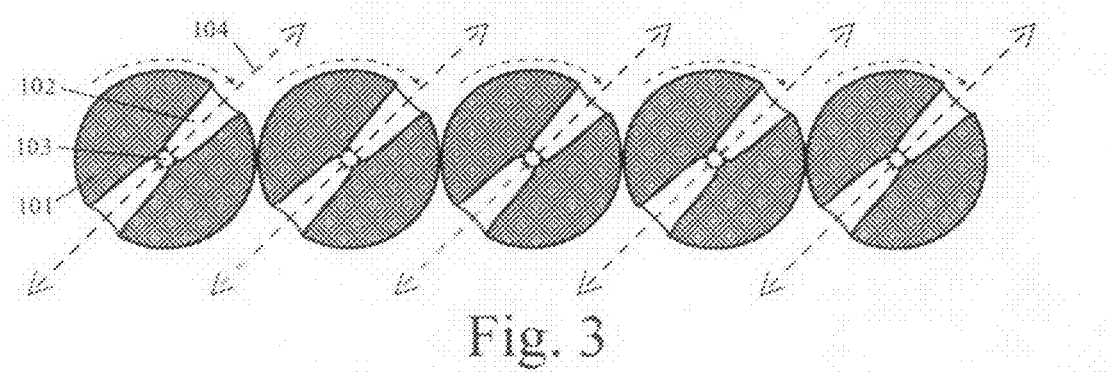

FIGS. 1 through 3 show lateral cross-sectional views of an example of this invention with five parallel longitudinal columns (such as 101) that rotate around their longitudinal axes. Each column contains light-emitting members (such as 103) along their longitudinal axis from which light rays (such as 104) travel through light-transmitting portions (such as 102) of the column. In this example, column 101 contains multiple light-emitting members along its longitudinal axis, but this lateral cross-sectional view shows only one (103). In this example, light emitting member (103) is a Light Emitting Diode (LED). These five parallel columns are part of a larger array of columns comprising a relatively two-dimensional display surface that creates the illusion of three-dimensional moving images. In a large display, there may be hundreds, or even thousands, of such columns. FIGS. 1 through 3 show a subset of only five columns out of this larger array in order to show structural details.

In the example shown in FIGS. 1 through 3, the main body of column 101 does not transmit light. The light-transmitting portion 102 within this columns does transmit and guide light, from light-emitting member 103 laterally through the cross-section of the column to exit column 101 at a certain angle shown by the arrow tip of light ray 104. In this example, light-transmitting portion 102 is a hollow opening through the column. In another example, light-transmitting portion 102 may be transparent material, forming a prism or lens that guides light from light-emitting member 103 to exit column 101. In this example, the sides of light-transmitting portion 102 reflect light to increase light display efficiency and to reduce heat absorption by the column. In another example, the sides of light-transmitting portion 102 may be light-absorbing to guide the exiting light rays more precisely.

The sequence of FIGS. 1 through 3 show these five columns at three different rotational angles. This shows how rotation of the columns changes the angle by which light ray 104 exits column 101. In this example, all five columns have the same motion as column 101. In FIG. 1, light ray 104 from column 101 exits the column cross-sectionally at roughly a 45-degree angle relative to the plane formed by the axes of the columns. In FIG. 2, the columns have rotated clockwise and light ray 104 now exits the column at roughly a 90-degree angle. In FIG. 3, the columns have rotated further and light ray 104 now exits the column at roughly a 135-degree. As the columns rotate and the angle of the exiting light rays changes, the content of the light rays emitted from light-emitting members also changes in synchronization so that the proper image from the proper angle is seen to create the illusion of a three-dimensional image.

In this example, the light-transmitting portion 102 of column 101 runs through the entire cross-section of column 101 and allows light to exit in two opposite directions as the column rotates. This allows two complete angular sweeps of the light rays exiting the column with each rotation of the column. This two-opening configuration eliminates a "blackout period" (while the opening is on the side opposite the viewer) that would occur if there were only a single opening. In another example, if the rotation speed is so fast that a black-out period would not be noticed due to image persistence, then having a light-emitting member located off-center with only one opening could be advantageous for some applications. For example, a single-opening configuration could allow longer light-transmitting portion for more precise ray direction and/or smaller-scale columns.

Using a rotating member to change the angle of emitted light rays can be an advantage over methods in the related art that use reciprocal movement of parallax barriers, lenticular lenses, or dynamic lens arrays. Rotating members do not spend energy or time overcoming inertia as is required with reciprocal movement. This can allow smoother and faster motion for guiding light rays along different angles. In this example, the columns rotate sufficiently fast that viewers see a continuous image, not a flickering image, due to persistence of vision.

Another advantage of using a rotating member to direct light rays in different angles, as compared to parallax barriers with vertical slits or 3D pixels with a limited number of sub-pixel light emitters, is that the change in angle is continuous rather than discrete. This allows a much greater degree of image precision. The only limitation is how rapidly the light content emitted by the light-emitting member can be changed, which is probably much less of a limitation than the number of vertical strips that can be used in a parallax barrier or the number of sub-pixel light emitters than one can fit into a pixel-size space.

In this example, all five columns rotate in the same clockwise direction. In another example, adjacent columns may rotate in clockwise and counter-clockwise directions. This latter design may be useful if the columns touch each other, especially if the columns are interconnected by gears as part of a rotational drive mechanism. In another example, the columns may switch rotational direction over time, creating a "window washer" motion for the light-emitting portion. A "window washer" motion might be useful for avoiding a black-out period with a single light-emitting opening if this outweighs the disadvantage of having to overcome inertia to change rotational direction.

Another advantage of this current invention is that it avoids a gap between a light-emitting surface and a parallax member such as a parallax barrier, lenticular array, or dynamic lens arrays. In this invention, the light-emitting member is directly contained within a light-transmitting portion within a rotating longitudinal member. This current invention enables multiple viewers from multiple locations to always see the correct three-dimensional image, avoiding pseudoscopic images with reversed depth, double images, or black lines that can occur in much of the related art.

In this example, the longitudinal axes of the columns are in parallel straight lines within the same plane. This creates a relatively flat display surface (albeit with rounded elements). Such a flat display surface can be useful for applications in laptop computers, cellular phones, and other portable electronics. In another example, the longitudinal axes of the columns may be in parallel straight lines along a curved surface in three-dimensional space. Such a curved display surface may be useful for providing some visual accommodation cues, in addition to motion parallax cues, for large-scale viewing applications. In another example, the axes of the columns need not be parallel. For example, the axes of the columns may be configured in a radial pattern. Radial columns could produce an image like that of a radar or sonar screen display, except that radial columns would display a three-dimensional image instead of a two-dimensional image like a conventional radar screen.

A single layer of parallel rotating columns, such as shown in this example, will only provide motion parallax along one axis of motion. For example, if the axes of the columns are generally vertical, then the resulting three-dimensional image will show motion parallax in response to horizontal (side to side) head movement by a viewer. If the axes of the columns are generally horizontal, then the resulting three-dimensional image will show motion parallax in response to vertical (up and down) head movement by the viewer. As we will discuss later, motion parallax that is responsive to both horizontal and vertical movement can be achieved with the addition of an optional second columnar layer.

Figure 4:
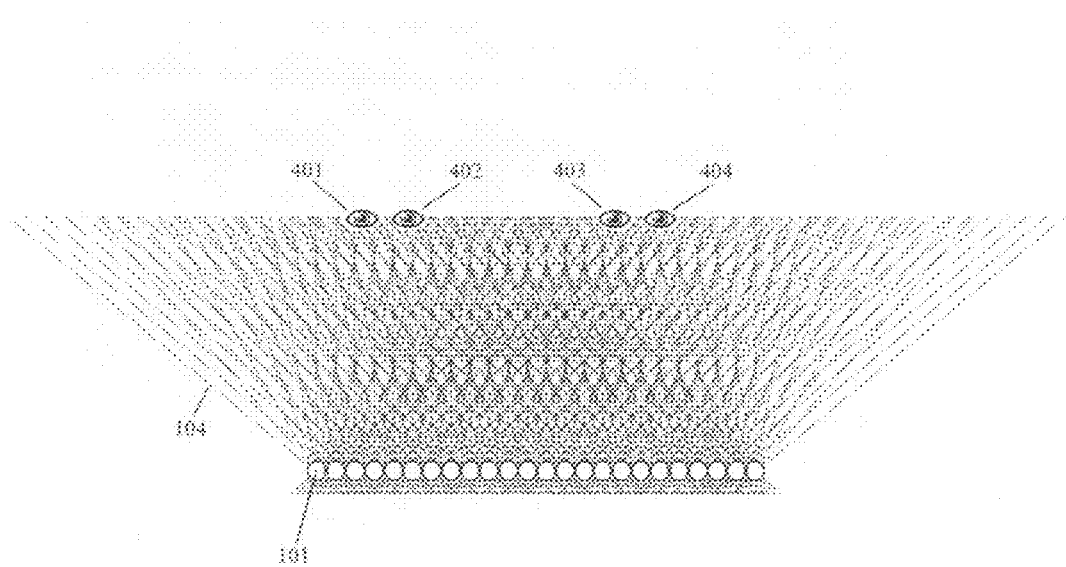
FIG. 4 shows the context for operation of this example with two viewers.

FIG. 4 provides a context for operation of the columnar display surface, of which the five columns in FIGS. 1 through 3 are a subset, with two viewers. FIG. 4 shows a top-down cross-sectional view of the parallel rotating columns (such as 101) and the emitted light rays (such as 104). They are part of a display surface that displays three-dimensional images that can be simultaneously viewed by multiple viewers in different locations. A first viewer is represented by right eye 401 and left eye 402. A second viewer is represented by right eye 403 and left eye 404.

Technically, FIG. 4 is a time lapse image because a light ray at only one angle would exit a given rotating column at a given moment and FIG. 4 shows multiple light rays at different angles simultaneously exiting each rotating column. However, if the rotation of the columns is sufficiently fast, then viewers will perceive all these light beams as simultaneous due to persistence of vision. When the light beams exiting at different angles are synchronized with the appropriate content for different perspectives of the image, then this device creates three-dimensional moving images that can be independently viewed by multiple viewers. Unlike much of the prior art, there are no pseudoscopic views with reversed depth, double images, or black lines when viewers move their heads. In this example, the rotating columns are one pixel wide. In this example, only around 20 rotating columns are shown in order to show details, but the number of columns in an actual display could be hundreds or thousands.

FIGS. 5 and 6 provide a conceptual view of how this example of a device for displaying three-dimensional moving images can replicate the light beam content and angles that the two viewers would see from real-world objects.

For example, FIG. 5 shows a top-down cross-sectional perspective of the two viewers, represented by eyes 401, 402, 403 and 404 who are observing spherical object 501 and cubic object 502. Approximate representations of the views seen by each of the four eyes 401, 402, 403, and 404 are shown as dotted-line images 503, 504, 505 and 506 respectively. For example, eye 401 sees a gap between spherical object 501 and cubic object 502 in dotted-line perspective representation 503. Eye 402 also sees such a gap, but from a slightly-different angle, so cubic object 502 is slightly tilted in dotted-line perspective 504. The combination of the two different perspectives, 503 and 504, from slightly-different angles is an important cue for three-dimensional perception. From the perspectives of viewer two, that person's eyes 403 and 404 see the spherical 501 and cubic 502 objects as overlapping without a gap. These perspectives are shown in dotted-line perspectives 505 and 506.

FIG. 6 shows a top-down cross-sectional perspective of the two viewers seeing the light rays emitted from the display surface comprised of a series of parallel longitudinal light-emitting columns, as discussed in prior figures. For diagrammatic purposes, only around 20 columns are shown, but the number of columns in an actual large-scale display could be in the hundreds or thousands. The content and angles of the light rays exiting the columns are synchronized so that each eye sees the appropriate content from the appropriate angle to create an illusion of the spherical and cubic objects being viewed in three-dimensions.

With a surface composed of only vertical-axis parallel rotating columns, the viewers will only see motion parallax with horizontal head movement (right and left on this diagram). We will discuss options that allow motion parallax with vertical head movement as well, but it is important to start with the basic concept before moving into options and greater complexity.

FIG. 7 shows a longitudinal cross-sectional view of column 101. This perspective is perpendicular to the lateral cross-sectional view of five columns in FIG. 1. For demonstration purposes, FIG. 7 shows seven light-emitting members (including 103) distributed along the longitudinal axis of column 101. In an actual large-scale display, such as a laptop or television, one column could contain hundreds or even thousands of light-emitting members distributed along its length.

FIG. 7 shows three light rays (including 104) coming out of column 101 from each light-emitting member (including 103). These three rays are representative of a virtually infinite continuum of radial light rays that fan out from each light-emitting member. Rather than clutter the diagram by showing a full set of radial light rays fanning out from each light-emitting member, they are represented by three rays. The three rays vary from a ray at a roughly 45-degree angle from the longitudinal axis of column 101 (such as 104) to a ray at a roughly 135-angle. Unlike FIG. 4, this is not a time lapse diagram. The entire set of light rays fanning out through the light-transmitting portion of column 101 occurs simultaneously.

FIG. 8 shows an oblique exterior view of five parallel columns (including 101) with rays of light exiting their perimeter as was the case with the column shown from a cross-sectional perspective in FIG. 7. As was the case with FIG. 7, this figure is at a given point in time with the rays of light exiting simultaneously. In this example, the light rays emitted are not coherent and the light-transmitting portions within the columns are not micro-thin, so the light rays do not form perfectly parallel image planes. However, the light-transmitting portions do channel the light rays into roughly parallel planes. These planes sweep through space in parallel as the columns rotate, directing light rays to viewer eyes at different angles in synchronization with different image perspectives to create the illusion of three-dimensionality with binocular disparity and motion parallax.

FIGS. 9 through 11 show how the light rays fanning out in a radial plane from the light-transmitting portions (such as 102) of column 101 move as the column rotates. In FIG. 9, the plane of the fanning light rays points upwards on the page, which would be approximately perpendicular to the image surface in the actual display device. In FIG. 10, column 101 has rotated approximately 45 degrees and so has the plane of fanning light rays. In FIG. 11, the column and plane of fanning light rays have rotated another 45 degrees.

In this example, rotation of the columns and corresponding planes of light rays happens simultaneously for all the parallel columns forming the image surface. As mentioned previously, when this rotation is sufficiently rapid, persistence of vision causes the eye to continue to see the image at a certain angle until the ray sweeps around and that angle image is again displayed. In this case, the rotating planes of light are perceived as simultaneous by the viewer.

When the content of the light plane changes in synchronization with changes in the angle of the light plane, then this device can display three-dimensional moving images with some degree of motion parallax as viewed simultaneously by multiple viewers. This is possible to a greater extent than with most methods in the related art because of the integration of the light-guiding member (e.g. light-transmitting portion in this invention) and the light emitting member. This is an improvement over methods in the related art that have a gap between the light-emitting display surface and a light-guiding member such as a parallax barrier or lenticular lens.

The means by which longitudinal columns are rotated and power is delivered to the light-emitting members are not central to this invention. However, it is useful to discuss examples of how these functions may be achieved. FIG. 12 shows an example of how a series of parallel columns (including 101) may be mounted on axles and interlocking gears to facilitate rotation. In this example, adjacent columns rotate in different (clockwise vs. counterclockwise) directions. This will work as long as image content is appropriately synchronized in different directions as well.

In the example in FIG. 12, rotating one column rotates all the columns. The gear for one column could be rotated by a gear mounted on a small electric motor, of which many are known in the prior art. In another example, the gears on the columns may not interlock with each other, but rather all be connected to a single drive chain that is connected to an electric motor that rotates them all simultaneously. In another example, the columns may have friction wheels driven by a single drive belt connected to an electric motor that rotates them all simultaneously. In another example, the columns may be metallic and be spun by the force of an electromagnetic field.

FIG. 12 also shows an example of how electricity may be routed to the light-emitting members (such as 103) that are contained in a rotating column. In this example, wires (such as 1201) connect the light-emitting members (such as 103) with metallic rings (such as 1202) that encircle the column (such as 101). In this example, these metallic rings (such as 1202) are in continuous frictional contact with flexible metal contacts (such as 1203) on a non-rotating surface to conduct electricity from the non-rotating surface to the light-emitting members. In another example, wires from light-emitting members may be routed through the central longitudinal axis of the column to a rotating multi-line connection a the end of the column. In another example, the light-emitting members may be powered by wireless power transmission.

In the examples shown in FIGS. 1 through 13, the longitudinal rotating light-guiding members are columns with a circular cross-section. FIG. 13 shows a lateral cross-sectional view of such a rotating column, column 101, with a circular lateral cross-section within which light-transmitting portion 102 transmits light ray 104 from light-emitting member 103. FIG. 13 shows this cross-sectional view through four sequences of rotation at 45 degree intervals.

FIG. 14 shows an alternative example of this invention in which the longitudinal rotating light-guiding member does not have a circular cross-section. In FIG. 14, the longitudinal rotating light guide is a column with a rectangular cross-section. FIG. 14 shows a lateral cross-sectional view of rotating column 1401 with a rectangular lateral cross-section containing light-transmitting portion 1402 that transmits light ray 1404 from light-emitting member 1403. FIG. 14 shows this cross-sectional view through four sequences of rotation at 45 degree intervals. In other examples, the cross-sectional shape of the longitudinal rotating member could be another polygon or convex shape. In other examples, the longitudinal rotating member may not have a uniform cross-sectional shape; it may be longitudinally sinusoidal or a series of linked spheres, for example.

An advantage of using a rotating column with a circular cross-section is a lower chance of damaging the rotating column by snagging it on an external object (such as someone accidentally touching the display surface with their finger if the display is not covered) or collision between adjacent rotating columns (if inter-columnar alignment becomes slightly awry). Nonetheless, there may be some circumstances under which non-circular cross-sections may be preferred due to lower manufacturing cost or specialized function.

The addition of a second layer of rotating columns may allow motion parallax when a viewer moves their head vertically (up and down) in addition to motion parallax when a viewer moves their head horizontally (back and forth). FIGS. 15 and 16 show an oblique external view of an example of this invention with an optional second layer of rotating columns having been added. In FIG. 15, a second layer of rotating columns (such as 1501) containing light-transmitting portions (such as 1502) has been added. The longitudinal axes of columns in the second layer are perpendicular to those of the first layer and the plane defined by their longitudinal axes is parallel to that of the first layer.

FIG. 15 shows this two-layer configuration before rotation. FIG. 16 shows this two-layer configuration after partial rotation of the second-layer. Operation of the device would entail full synchronized rotation of both layers. For example, this synchronization may involve a complete rotation of the second layer for each angular position of the first layer, like a second hand making a complete rotation for each position of the minute hand on a clock.

However, the addition of a second layer of rotating columns raises some technical issues that must be addressed. For example, there is a gap between the second layer and the light-emitting members contained within columns in the first layer. This gap may cause problems similar to those that occur with methods in the related art involving a gap between parallax barriers, lenticular arrays, or dynamic lens arrays and a light-emitting surface. As the columns in the second layer rotate, they do not provide a consistent line-of-sight to the same light-emitting member in the first column throughout their rotation. One way to address this problem is to have light-emitting members in the first column relatively close to each other and to coordinate shifting image content across multiple light-emitting members as the column in the second layer rotates. A second way to address this problem is to have the columns in the second layer shift as well as rotate, as shown in FIG. 16.

In FIG. 16, the columns in the second layer (including 1501) shift laterally while rotating so that they always provide a line-of-sight to the same light-emitting member in the first-layer column (including 101) below. In an example, columns in the second layer may rotate faster than columns in the first layer, as noted earlier in the second hand vs. minute hand analogy. Columns in the second layer may make a full rotation for each rotational angle change of columns in the first layer. At any given moment, there will be only one point-ray of light exiting the two-layer structure from each light-emitting member, as opposed to an entire plane of light fanning out from a one-layer structure from each light-emitting member. When the content of each point-ray of light is synchronized with respect to its vector angle in three-dimensions, then this two-layer configuration enables display of three-dimensional images with vertical as well as horizontal motion parallax for multiple viewers.

FIGS. 17 through 25 show a sequence of close-up views of an example of sequential rotation and shifting of a second layer of columns relative to rotation of a first layer of columns. They show a small section of one column (1501) from the second layer on top of a small section of one column (101) from the first layer. In these sequential diagrams, column 1501 of the second layer makes a full rotation for each angular position of column 101 of the first layer, but only three sample rotational positions are shown for each. FIGS. 17 through 25 include nine diagrams because three rotational positions of column 1501 are shown for each of three rotational positions of column 101.

Figure 17:
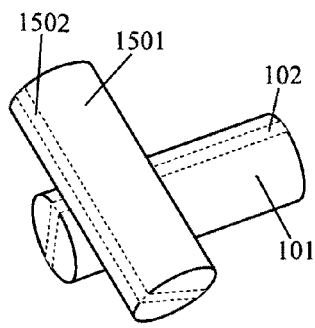

In FIG. 17, the light-transmitting portion of first-layer column 101 contains light-emitting members and is positioned so that it transmits rays of light that fan outward in a plane roughly perpendicular to the plane created by the longitudinal axes of columns in the first layer. Second-layer 1501 contains no light-emitting members, but does selectively transmit light rays exiting the first column. In FIG. 17, the light-transmitting portion of second-layer column 1501 is aligned at approximately a 45-degree angle to the plane created by the longitudinal axes of columns in the first layer. Column 1501 blocks all the rays in the plane exiting column 101 except for a point-ray with a clear line of sight through both columns to a light-emitting member in the center of this section of column 101.

Figure 18:
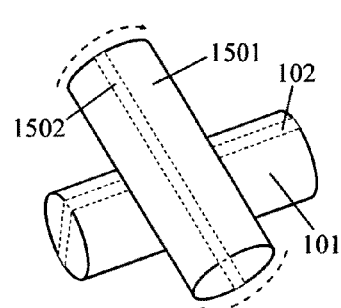
Figure 19:
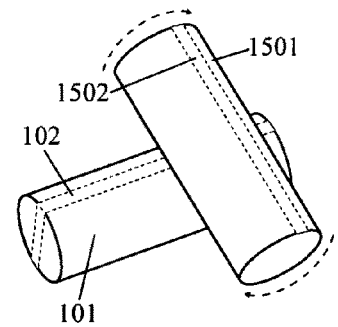
Figure 20:
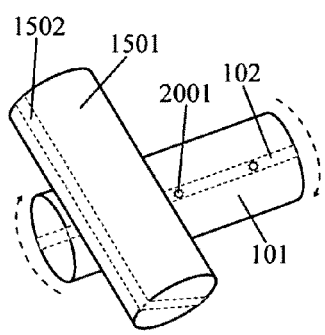
Figure 21:
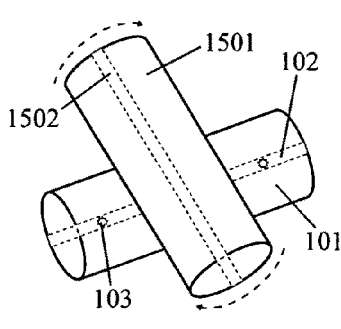
Figure 22:
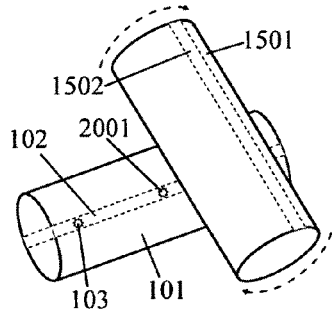
Figure 23:
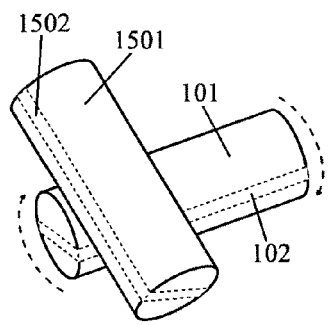
Figure 24:
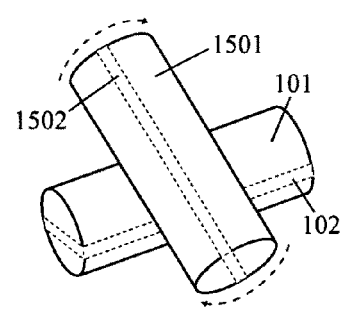
Figure 25:
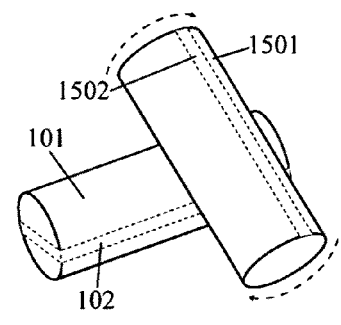

In FIG. 18, the position of column 101 is not changed, but column 1501 has rotated. Column 1501 has also shifted towards the center of the section of column 101 shown so that it continues to provide a clear line of sight to the same light-emitting member in the center of the section. In FIG. 19, column 1501 has rotated and shifted further. In FIG. 20, the position of column 101 has rotated and column 1501 is shown having fully rotated back to its initial position in FIG. 17. In FIG. 20, column 101 has rotated to a position where light-emitting member 2001 is now visible to the figure viewer through light-transmitting portion 102. In FIGS. 21 and 22, column 1501 rotates and shifts across column 101. The final sequence in this series is FIGS. 23 through 25, with column 101 having rotated to a new position and column 1501 rotating and shifting.

FIGS. 26 through 28 show an example of this invention in which the rotating columns of the second layer have multiple light-transmitting portions, not just one. In this example, there are six parallel light-transmitting portions allowing light to pass in a given direction through the lateral cross-sections of the rotating columns in the second layer. This example may allow more efficient use of light. It allows more light through the second layer while still directing the angle of the light. It may also reduce or eliminate the need for the second layer of columns to shift as well as rotate, as long as there is proper coordination of image content from different image-emitting members and the sequential display angles.

I claim:

1. A device for displaying three-dimensional images, comprising:
    a plurality of longitudinal light-guiding members that rotate around their longitudinal axes,
    a plurality of light-emitting members inside each longitudinal light-guiding member, wherein light rays from light-emitting members are guided through light-transmitting portions of the longitudinal light-guiding member so that the directions of the light rays change as the longitudinal light-guiding member rotates; and wherein changes in the content of light rays from the light-emitting members are coordinated with changes in the directions of those light rays to create three-dimensional images.

2. The plurality of longitudinal light-guiding members in claim 1 wherein the light-guiding members are parallel to each other or are configured in a radial pattern.

3. The plurality of longitudinal light-guiding members in claim 1 wherein the light-guiding members are configured on a flat surface or on a curved surface.

4. The plurality of longitudinal light-guiding members in claim 1 wherein the light-guiding members are in a layer of vertically-oriented members providing motion parallax in response to horizontal viewer movement.

5. The plurality of longitudinal light-guiding members in claim 1 wherein the light-guiding members are configured in two parallel layers that are oriented perpendicularly to each other, so as to provide motion parallax in response to either horizontal or vertical viewer movement.

6. The light-transmitting portions of the longitudinal light-guiding members in claim 1 wherein the light-transmitting portions are hollow or are made from transparent material.

7. The light-transmitting portions of the longitudinal light-guiding members in claim 1 wherein the light-transmitting portions guide light out from one side or from both sides of the lateral cross-section of the light-guiding members.

8. The light-emitting members in claim 1 wherein the light-emitting members are Light Emitting Diodes (LEDs).

9. The light-emitting members in claim 1 wherein the light-emitting members are distributed along the longitudinal axis of the longitudinal light-guiding members or are distributed along one side of the longitudinal light-emitting members.

10. A device for displaying three-dimensional images that feature binocular disparity and motion parallax, comprising:
    a plurality of longitudinal light-guiding members that rotate around their longitudinal axes, wherein these members have lateral cross-sectional shapes that are at least partially convex, and
    a plurality of light-emitting members inside each longitudinal light-guiding member, wherein light rays from light-emitting members are guided through light-transmitting portions of the longitudinal light-guiding member so that the directions of the light rays change as the longitudinal light-guiding member rotates; and wherein changes in the content (including light intensity and color) of light rays from the light-emitting members are coordinated with changes in the directions of those light rays to create three-dimensional images featuring binocular disparity and motion parallax.

11. The plurality of longitudinal light-guiding members in claim 10 wherein the light-guiding members are parallel to each other or are configured in a radial pattern.

12. The plurality of longitudinal light-guiding members in claim 10 wherein the light-guiding members are configured on a flat surface or on a curved surface.

13. The plurality of longitudinal light-guiding members in claim 10 wherein the light-guiding members are in a layer of vertically-oriented members providing motion parallax in response to horizontal viewer movement.

14. The plurality of longitudinal light-guiding members in claim 10 wherein the light-guiding members are configured in two parallel layers that are oriented perpendicularly to each other, so as to provide motion parallax in response to either horizontal or vertical viewer movement.

15. The light-transmitting portions of the longitudinal light-guiding members in claim 10 wherein the light-transmitting portions are hollow or are made from transparent material.

16. The light-transmitting portions of the longitudinal light-guiding members in claim 10 wherein the light-transmitting portions guide light out from one side or from both sides of the lateral cross-section of the light-guiding members.

17. The light-emitting members in claim 10 wherein the light-emitting members are Light Emitting Diodes (LEDs).

18. The light-emitting members in claim 10 wherein the light-emitting members are distributed along the longitudinal axis of the longitudinal light-guiding members or are distributed along one side of the longitudinal light-emitting members.

19. A method for displaying three-dimensional images involving:
    placing light-emitting members inside longitudinal light-guiding members;
    rotating those longitudinal light-guiding members around their longitudinal axes; and
    coordinating changes in the content of light rays from the light-emitting members with changes in the directions of those light rays to create three-dimensional images.

* * * * *